(12) United States Patent
Kusano et al.

(10) Patent No.: US 12,334,742 B2
(45) Date of Patent: Jun. 17, 2025

(54) POWER MANAGEMENT APPARATUS, POWER MANAGEMENT SYSTEM, AND POWER MANAGEMENT METHOD

(71) Applicant: KYOCERA CORPORATION, Kyoto (JP)

(72) Inventors: Yoshimasa Kusano, Kyoto (JP); Kazuaki Azuma, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 410 days.

(21) Appl. No.: 17/602,774

(22) PCT Filed: Apr. 9, 2020

(86) PCT No.: PCT/JP2020/015923
§ 371 (c)(1),
(2) Date: Oct. 11, 2021

(87) PCT Pub. No.: WO2020/209322
PCT Pub. Date: Oct. 15, 2020

(65) Prior Publication Data
US 2022/0200286 A1  Jun. 23, 2022

(30) Foreign Application Priority Data

Apr. 12, 2019 (JP) .................. 2019-076542
May 21, 2019 (JP) .................. 2019-095423

(51) Int. Cl.
*G06Q 30/0283* (2023.01)
*G06Q 50/06* (2012.01)
*H02J 3/38* (2006.01)
*H02J 13/00* (2006.01)

(52) U.S. Cl.
CPC .......... *H02J 3/381* (2013.01); *G06Q 30/0283* (2013.01); *G06Q 50/06* (2013.01); *H02J 13/00007* (2020.01)

(58) Field of Classification Search
CPC .......................... G06Q 30/0283; G06Q 50/06
USPC .................................................. 705/412, 1.1
See application file for complete search history.

(56) References Cited

U.S. PATENT DOCUMENTS

| 10,091,253 | B2 | 10/2018 | Sedar et al. |
| 2011/0061015 | A1 | 3/2011 | Drees et al. |
| 2016/0063456 | A1 | 3/2016 | Droege |
| 2016/0358472 | A1 | 12/2016 | Bezak et al. |

FOREIGN PATENT DOCUMENTS

| CN | 209746748 U | * | 12/2019 |
| JP | 2004201200 A | * | 7/2004 |
| JP | 2004362326 A | * | 12/2004 |

(Continued)

*Primary Examiner* — Akiba K Robinson
(74) *Attorney, Agent, or Firm* — HAUPTMAN HAM, LLP

(57) ABSTRACT

A power management apparatus includes a management unit configured to manage data of output power output from a distributed power supply provided in a predetermined facility, a detection unit configured to detect that a user having the distributed power supply is present in a visit space other than the predetermined facility, and a control unit configured to perform, when the user is present in the visit space, interchange processing of providing the output power to the visit space based on the data of the output power.

18 Claims, 15 Drawing Sheets

(56) References Cited

FOREIGN PATENT DOCUMENTS

| JP | 2011180791 A | 9/2011 | | |
|----|--------------|--------|---|---|
| JP | 2011186721 A | 9/2011 | | |
| JP | 2013153610 A | 8/2013 | | |
| JP | 2015005205 A | 1/2015 | | |
| JP | 2016103965 A | 6/2016 | | |
| JP | WO2015145923 A1 | 4/2017 | | |
| WO | WO-2010019854 A2 * | 2/2010 | ......... | G06Q 30/0235 |
| WO | WO-2011095876 A2 * | 8/2011 | ........ | H02J 13/00004 |

* cited by examiner

| ID | OUTPUT POWER | POSITION INFORMATION |
|---|---|---|
| PPP | AAA | XX STATION |
| QQQ | BBB | XX TRAIN |
| RRR | CCC | XX SC |
| ... | ... | ... |

FIG. 3

POWER MANAGEMENT APPARATUS, POWER MANAGEMENT SYSTEM, AND POWER MANAGEMENT METHOD

RELATED APPLICATIONS

The present application is a National Phase of International Application Number PCT/JP2020/015923 filed Apr. 9, 2020 and claims priority to Japanese Application Numbers 2019-076542 filed Apr. 12, 2019 and 2019-095423 filed May 21, 2019.

TECHNICAL FIELD

The present disclosure relates to a power management apparatus, a power management system, and a power management method.

BACKGROUND ART

In recent years, power generation devices that utilize natural energy such as sunlight, wind power, hydropower, and geothermal heat have attracted attention. A technology has been proposed in which output power output from a power generation device is converted into a predetermined value (valuable points or credit), and the predetermined value is assigned to a terminal (such as an IC card or a mobile phone) of a user who owns the power generation device (for example, Patent Literature 1).

CITATION LIST

Patent Literature

Patent Literature 1: JP 2011-180791 A

SUMMARY OF INVENTION

A power management apparatus according to a first aspect includes a management unit configured to manage data of output power output from a distributed power supply provided in a predetermined facility, a detection unit configured to detect that a user having the distributed power supply is present in a visit space other than the predetermined facility, and a control unit configured to perform, when the user is present in the visit space, interchange processing of providing the output power to the visit space based on the data of the output power.

A power management system according to a second aspect includes a management unit configured to manage data of output power output from a distributed power supply provided in a predetermined facility, a detection unit configured to detect that a user having the distributed power supply is present in a visit space other than the predetermined facility, and a control unit configured to perform, when the user is present in the visit space, interchange processing of providing the output power to the visit space based on the data of the output power.

A power management method according to a third aspect includes managing data of output power output from a distributed power supply provided in a predetermined facility, detecting that a user having the distributed power supply is in a visit space other than the predetermined facility, and performing, when the user is present in the visit space, interchange processing of providing the output power to the visit space based on the data of the output power.

BRIEF DESCRIPTION OF DRAWINGS

FIG. 3 is a table showing an example of management data according to the embodiment.

DESCRIPTION OF EMBODIMENTS

Embodiments will be described below with reference to the drawings. Note that in the following description of the drawings, identical or similar components will be denoted by identical or similar reference signs. However, the drawings are schematic.

Embodiment

Power Management System

Figure 1:
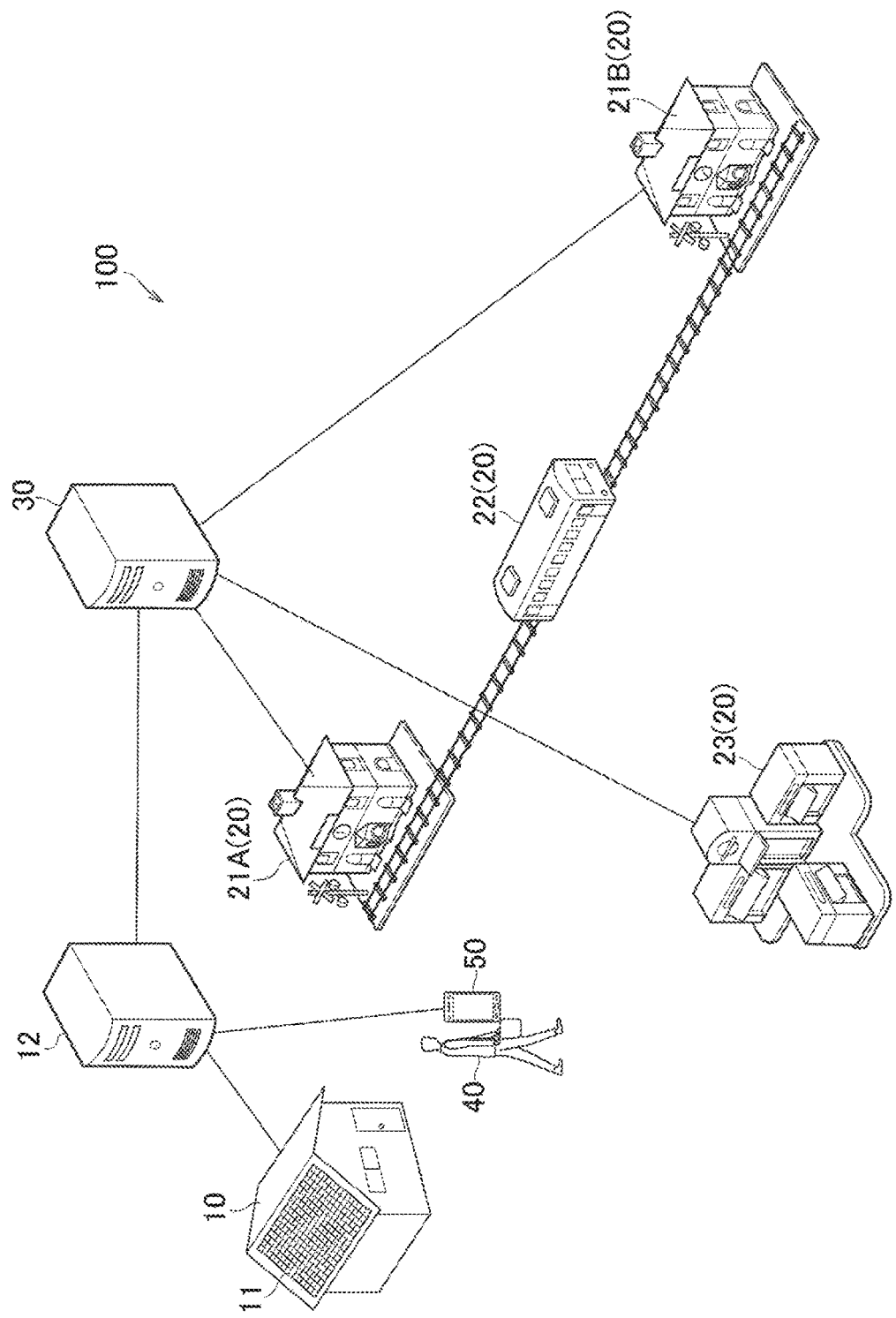
FIG. 1 is a diagram illustrating a power management system 100 according to an embodiment.

A power management system according to an embodiment will be described below. As illustrated in FIG. 1, a power management system 100 includes a user facility 10, a visit space 20, a power management apparatus 30, and a user medium 50 carried by a user 40.

The user facility 10 is an example of a predetermined facility provided with a solar cell device 11. The solar cell device 11 is an example of a distributed power supply provided in the user facility 10. The solar cell device 11 is also an example of a power generation device that generates electric power by utilizing natural energy. The user facility 10 may include an energy management system (EMS) 12 that manages electric power of the user facility 10. The EMS 12 may be provided by a cloud service. The EMS 12 has a function of communicating with at least the power management apparatus 30. For example, the user facility 10 may be a house owned by the user 40 or an organization (company or school) to which the user 40 belongs. When the user 40 owns a power selling facility (for example, a facility where equipment is certified to sell power from 10 kW to 50 kW), the user facility 10 may include the power selling facility. However, the user facility 10 is not limited thereto, and the user facility 10 need only include the solar cell device 11. The solar cell device 11 may be owned by the user 40 or may be lent to the user 40. In other words, the user 40 need only be a representative person having a right related to the output power of the solar cell device 11.

Here, the EMS 12 communicates with a device provided in the user facility 10 (for example, the distributed power supply such as the solar cell device 11), or communicates with a sensor that detects electric power of the device provided in the user facility 10. In such a case, the EMS 12 may transmit, to the power management apparatus 30, data (hereinafter referred to as output power data) of output power output from the solar cell device 11. The EMS 12 may transmit position information of the user medium 50 to the power management apparatus 30 by communicating with the user medium 50. The position information of the user medium 50 may be transmitted directly from the user medium 50 to the power management apparatus 30.

The visit space 20 is a space that the user 40 may visit. For example, the visit space 20 may be a space including a station 21 such as a boarding station 21A where the user 40 boards a train and an alighting station 21B where the user 40 gets off the train, a space inside a train 22, or a space including a shopping center (hereinafter referred to as SC) 23. The visit space 20 may be a space inside a building at a visit destination (such as the station 21 or the SC 23), or may be a space in the premises of the visit destination. The visit space 20 may be a space in which a distance between the building or the premises of the visit destination and the user 40 is shorter than or equal to a threshold value. Although not particularly limited, the visit space 20 may be regarded as any of the boarding station 21A, the alighting station 21B, the train 22, or the SC 23. The train 22 is an example of a moving body that carries the user 40.

The power management apparatus 30 manages data (the output power data described above) of the output power output from the solar cell device 11. Here, the output power may be electric power that flows in a reverse direction from the user facility 10 to a power system. In other words, the output power may be surplus power obtained by subtracting electric power consumed at the user facility 10 from the electric power output from the solar cell device 11. The power management apparatus 30 performs interchange processing based on the output power data. Details of the power management apparatus 30 will be described later (see FIG. 2).

The user 40 is an example of a user that is in possession of at least the solar cell device 11. The user 40 may own the user facility 10.

The user medium 50 need only be a medium carried by the user 40. For example, the user medium 50 may be a terminal such as a smartphone or a tablet, or may be an IC card such as a credit card or a point card. In the embodiment, a case in which the user medium 50 is a smartphone is primarily used as an example. Details of the user medium 50 will be described later (see FIG. 4).

Here, the power management apparatus 30 is connected to the user facility 10 (here, the user facility 10 includes the EMS 12, same applies hereafter) via a network. The power management apparatus 30 may be connected to the boarding station 21A, the alighting station 21B, and the SC 23 via a network. The power management apparatus 30 may be connected to the train 22 and the user medium 50 via a network. Although not particularly limited, the network may include the Internet, and may include a mobile communication network. The network may include a virtual private network (VPN).

Power Management Apparatus

Figure 2:
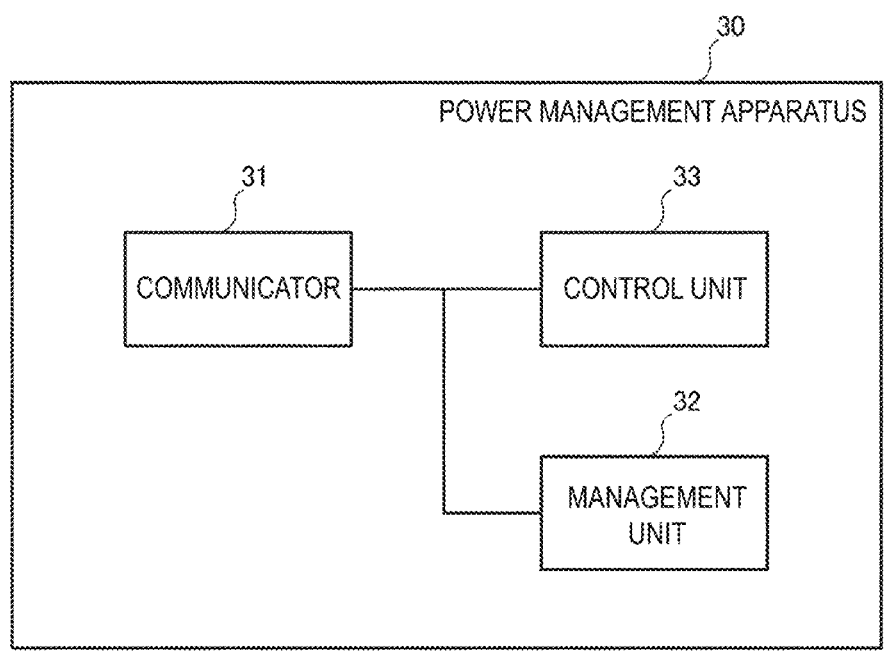
FIG. 2 is a diagram illustrating a power management apparatus 30 according to the embodiment.

The power management apparatus according to the embodiment will be described below. As illustrated in FIG. 2, the power management apparatus 30 includes a communicator 31, a management unit 32, and a control unit 33.

The communicator 31 is configured of a communication module. The communication module may be a wireless communication module compliant with standards such as IEEE 802.11a/b/g/n, ZigBee, Wi-SUN, LTE, 5G, and 6G, or may be a wired communication module compliant with standards such as IEEE 802.3.

The communicator 31 receives the output power data from the user facility 10. The communicator 31 may periodically receive the output power data from the user facility 10, or may receive the output power data from the user facility 10 in response to a request by the power management apparatus 30 (the control unit 33). The communicator 31 may receive the output power data from the user facility 10 in response to proximity of the user 40 to the visit space 20 (for example, including a space where the distance between the building or the premises of the visit destination and the user 40 is shorter than or equal to the threshold value). After the proximity of the user 40 to the building or the premises of the visit destination is identified by the user medium 50, information of the proximity may be transmitted from the user medium 50 to the power management apparatus 30. The proximity of the user 40 to the building or the premises of the visit destination may be identified based on the position information received from the user medium 50. The output power data may include an instantaneous value of the output power (value of instantaneous power), or may include an integrated value of the output power (value of integrated electric power). The communicator 31 may transmit, to the user medium 50, data of a value (hereinafter, referred to as value data) corresponding to the power interchange to be described below.

The communicator 31 may receive, from the visit space 20 (such as a gate), information indicating that the user 40 has passed through a gate provided in the visit space 20. The communicator 31 may receive, from the visit space 20 (such as a settlement device), information indicating that the user 40 has used a settlement device provided in the visit space 20. In other words, the communicator 31 is an example of a detection unit that detects that the user 40 is present in the visit space 20 excluding the user facility 10. Specifically, the communicator 31 may detect at least one of the user 40 entering the visit space 20 and the user 40 exiting from the visit space 20 based on the user 40 passing through the gate. The communicator 31 may detect that the user 40 is present in the visit space based on the user 40 using the settlement device.

The management unit 32 is configured of a storage medium such as a memory including a non-volatile memory, a hard disk drive (HDD) and/or the like, and stores various types of information.

The management unit 32 manages the data (hereinafter, referred to as management data) shown in FIG. 3. The management data includes IDs and output power. The IDs and the output power are examples of the output power data. The ID is information for identifying at least one of the user facility 10 and the solar cell device 11. The management data may include position information. The position information includes information indicating the visit space 20 in which the user 40 is present. The position information may include information indicating that the user 40 is present in the user facility 10. The position information may include information indicating that the user 40 is present in neither the user facility 10 nor the visit space 20. The position information may be identified based on information received from the gate or the settlement device provided in the visit space 20.

The control unit 33 may include at least one processor. The at least one processor may be configured of a single integrated circuit (IC) or a plurality of circuits (such as integrated circuits and/or discrete circuits) connected so as to be capable of communicating with each other.

When the user 40 is present in the visit space 20, the control unit 33 performs interchange processing of providing the output power to the visit space 20 based on the output power data. Here, the interchange processing is processing of providing the output power from the user facility 10 to the visit space 20, and includes, for example, processing that will be described below.

The interchange processing may include processing (hereinafter, referred to as right transfer processing) of transferring a right related to the output power to a management entity of the visit space 20. The management entity may be an entity that directly manages the visit space 20 or an entity that indirectly manages the visit space 20. In the right transfer processing, the right related to the output power may be regarded as being transferred from the user 40 to the management entity. The right related to the output power may include at least any one of the fact that the output power has been output from the solar cell device 11, the output power itself, and an environmental added value associated with the output power (for example, a tradable green certificate).

For example, the right related to the output power may include the output power itself output from the solar cell device 11 in a time period during which the user 40 is present in the visit space 20, or an environmental added value associated with such output power.

Here, for the right related to the output power that is transferable to the visit space 20, a cumulative value of the output power in the time period during which the user 40 is present in the visit space 20 may be defined as an upper limit. The output power defining the upper limit may include a cumulative value of the output power in a time period from the time at which the user 40 approaches the building or the premises of the visit destination to the time when the user 40 enters the building or the premises of the visit destination. The proximity of the user 40 to the building or the premises of the visit destination may be identified by the user medium 50 and then information of the proximity may be received from the user medium 50, or the proximity may be identified based on the position information received from the user medium 50.

In such cases, the control unit 33 may assign a value corresponding to the power interchange to the user 40. For example, the control unit 33 may transmit the value data to the user medium 50 by controlling the communicator 31.

For example, the value to be assigned to the user 40 may be a value corresponding to the right transferred to the visit space 20 in the right transfer processing described above. Although not particularly limited, the form of the value may be money, or may be points that are exchangeable for a product, a service, or money. The money may be a legal currency or a virtual currency. The money or points may be stored in the user medium 50 as value data (electronic data).

In such cases, the control unit 33 may set the value to be assigned to the user 40 based on the length of the time period during which the user 40 is present in the visit space 20. For example, the control unit 33 may set a higher value for a longer time period.

The control unit 33 may set the value to be assigned to the user 40 based on a travel distance of the moving body (train 22) when the visit space 20 is a space inside the moving body. For example, the control unit 33 may set a higher value for a longer travel distance.

The control unit 33 may set the value to be assigned to the user 40 based on the right related to the output power that is transferred from the user facility 10 to the visit space 20. Specifically, the control unit 33 may set the value to be assigned to the user 40 based on the output power when the right related to the output power includes the output power output from the solar cell device 11. For example, the control unit 33 may set a higher value for a larger output power. When the right related to the output power includes an environmental added value, the control unit 33 may set the value to be assigned to the user 40 based on the environmental added value. For example, the control unit 33 may set a higher value for a higher environmental added value.

Furthermore, when the control unit 33 determines whether the user 40 is present in the visit space 20 by using the settlement device, the control unit 33 may perform processing that will be described below. The control unit 33 may set the value assigned to the user 40 based on a settlement amount. For example, the control unit 33 may set a higher value for a larger settlement amount.

User Medium

Figure 4:
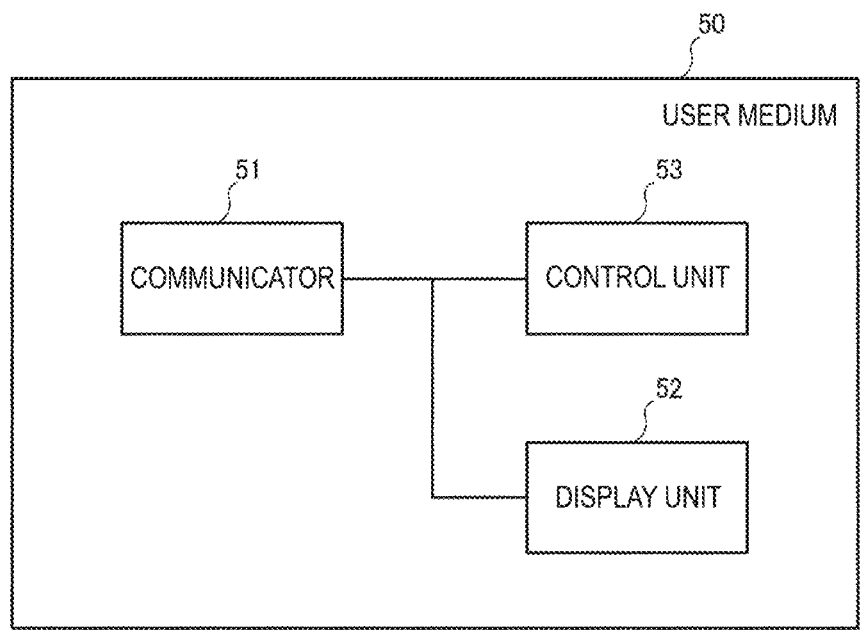
FIG. 4 is a diagram illustrating a user medium 50 according to the embodiment.

A user medium according to the embodiment will be described below. As illustrated in FIG. 4, the user medium 50 includes a communicator 51, a display unit 52, and a control unit 53.

The communicator 51 is configured of a communication module. The communication module may be a wireless communication module compliant with standards such as IEEE 802.11a/b/g/n, ZigBee, Wi-SUN, LTE, 5G, and 6G, or may be a wired communication module compliant with standards such as IEEE 802.3.

The communicator 51 may receive the output power data from the user facility 10. The data (the value data described above) of the value corresponding to the power interchange may be received from the power management apparatus 30. The communicator 51 may transmit the fact of permitting the power interchange to the power management apparatus 30. The communicator 51 may transmit the fact of not permitting the power interchange to the power management apparatus 30.

The display unit 52 includes a panel such as a liquid crystal panel or an organic EL panel. The display unit 52 may include a touch panel.

The display unit 52 may display the output power data. The display unit 52 may display the right related to the output power. The display unit 52 may display information (for example, a level of the output power or the environmental added value) for setting the content of the right related to the output power. The display unit 52 may display the value to be assigned by the interchange processing. The display unit 52 may display options to determine whether to permit the interchange processing.

The control unit 53 may include at least one processor. The at least one processor may be configured of a single integrated circuit (IC) or a plurality of circuits (such as integrated circuits and/or discrete circuits) connected so as to be capable of communicating with each other.

The control unit 53 may control an image to be displayed on the display unit 52 based on information received by the communicator 51. The control unit 53 may control the communicator 51 based on an operation of the user based on the image displayed on the display unit 52.

Power Management Method

A power management method according to the embodiment will be described below.

Figure 5:
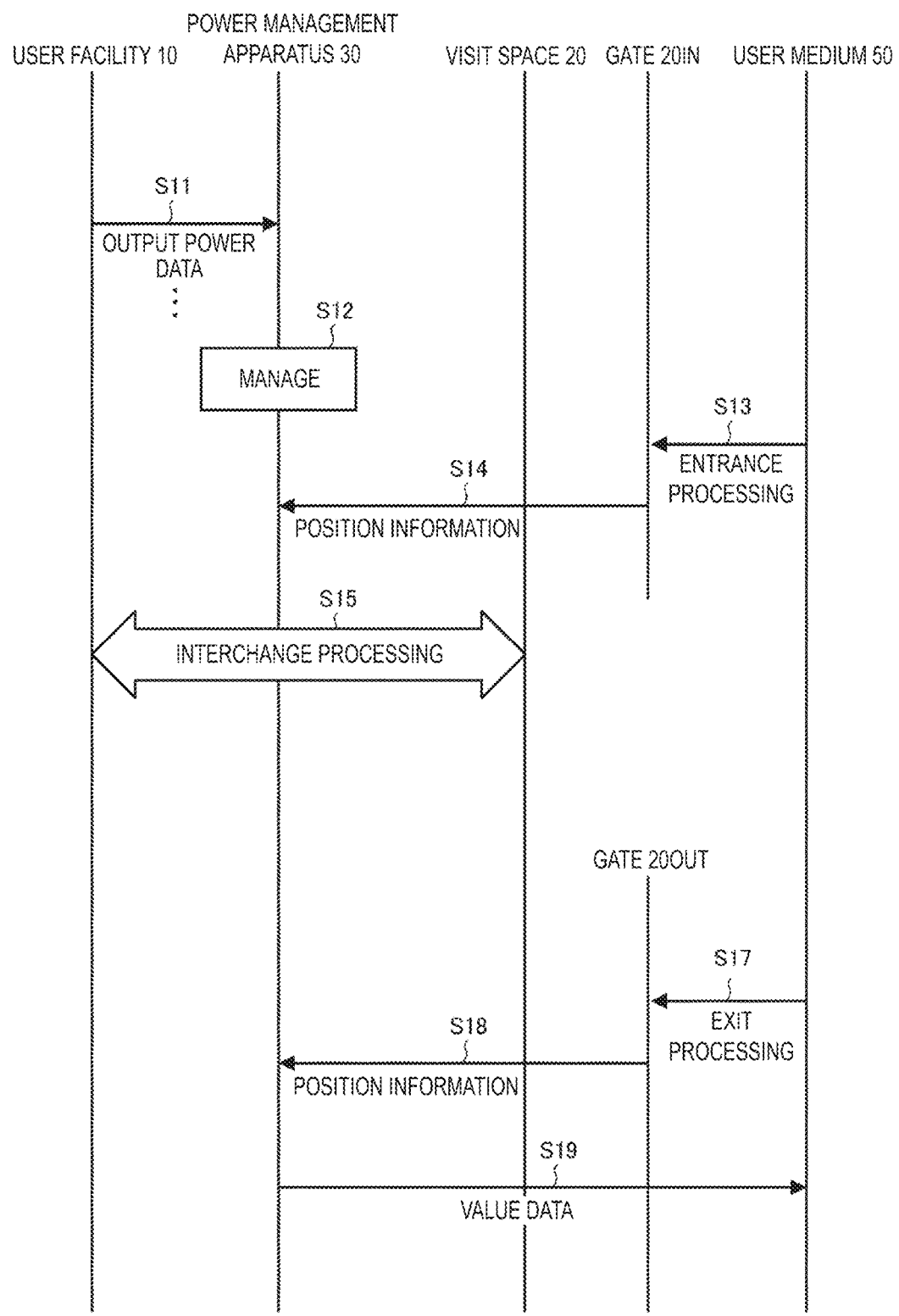
FIG. 5 is a diagram illustrating a power management method according to the embodiment.

First, a case will be described in which whether the user 40 is present in the visit space 20 is determined by using the gate provided in the visit space 20. In FIG. 5, a case is exemplified in which a gate 20IN used for detecting that the user 40 has entered the visit space 20 and a gate 20OUT used for detecting that the user 40 has exited from the visit space 20 are provided. However, the gate 20IN and the gate 20OUT may be included in one gate provided that it is possible to distinguish between entry and exit of the user 40.

As illustrated in FIG. 5, in step S11, the user facility 10 transmits the output power data that is managed (or stored) by the EMS 12 to the power management apparatus 30. For example, the user facility 10 periodically transmits the output power data to the power management apparatus 30.

In step S12, the power management apparatus 30 manages the output power data.

In step S13, the user medium 50 transmits, to the gate 20IN, the fact of having passed through the gate 20IN (entrance processing).

In step S14, the gate 20IN transmits position information of the user 40 to the power management apparatus 30. In other words, the gate 20IN transmits, to the power management apparatus 30, information indicating that the user 40 has entered the visit space 20.

In step S15, the power management apparatus 30 performs interchange processing of providing the output power from the user facility 10 to the visit space 20. For example, the interchange processing may include transferring the right related to the output power.

In step S17, the user medium 50 transmits, to the gate 20OUT, the fact of having passed through the gate 20OUT (exit processing).

In step S18, the gate 20OUT transmits position information of the user 40 to the power management apparatus 30. That is, the gate 20OUT transmits, to the power management apparatus 30, information indicating that the user 40 has exited from the visit space 20.

In step S19, the power management apparatus 30 sets the value to be assigned to the user 40, and transmits the value data described above to the user medium 50. The method of setting the value is as described above.

Figure 6:
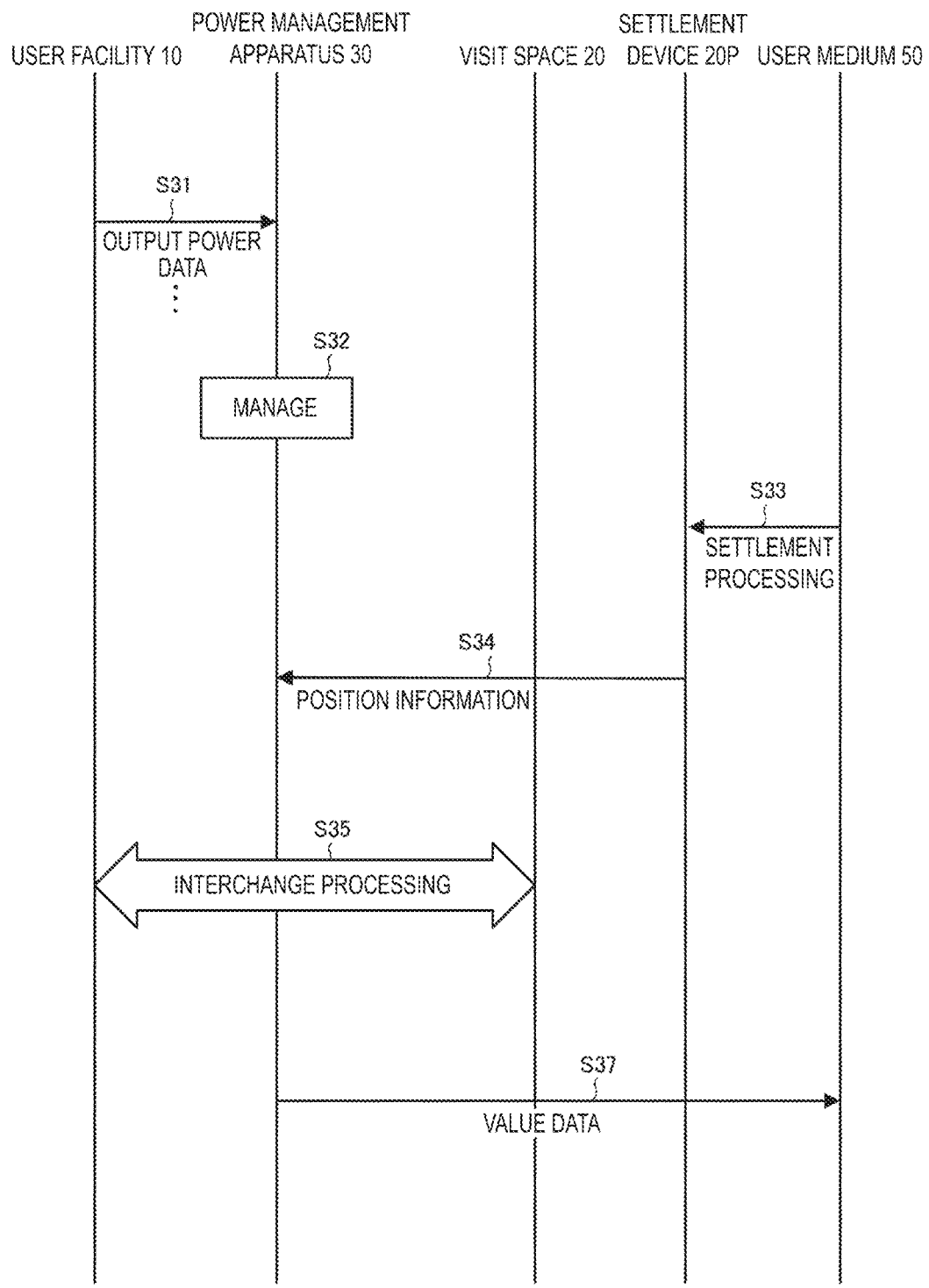
FIG. 6 is a diagram illustrating the power management method according to the embodiment.

Second, a case will be described in which whether the user 40 is present in the visit space 20 is determined by using a settlement device provided in the visit space 20. With reference to FIG. 6, a case will be described in which the user medium 50 is used for settlement processing. However, the embodiment is not limited to this example. In the settlement processing, a settlement by using a credit card may be performed.

As illustrated in FIG. 6, in step S31, the user facility 10 transmits the output power data to the power management apparatus 30. For example, the user facility 10 periodically transmits the output power data to the power management apparatus 30.

In step S32, the power management apparatus 30 manages the output power data.

In step S33, the user medium 50 transmits settlement data to a settlement device 20P (settlement processing).

In step S34, the settlement device 20P transmits position information of the user 40 to the power management apparatus 30. That is, the settlement device 20P transmits, to the power management apparatus 30, information indicating that the user 40 is present in the visit space 20.

In step S35, the power management apparatus 30 performs interchange processing of providing the output power from the user facility 10 to the visit space 20. For example, the interchange processing may include transferring the right related to the output power, as described above.

In step S37, the power management apparatus 30 sets the value to be assigned to the user 40, and transmits the value data described above to the user medium 50. The method of setting the value is as described above.

In FIG. 5 and FIG. 6, the value data is transmitted from the power management apparatus 30 to the user medium 50. In such cases, a management entity of the visit space 20 may be responsible for the value to be assigned to the user 40.

Actions and Effects

In the embodiment, when the user 40 is present in the visit space 20, the power management apparatus 30 performs the interchange processing of providing the output power to the visit space 20 based on the output power data. Thus, the user 40 can freely utilize the output power in terms of bringing the output power output from the solar cell device 11 provided in the user facility 10 to the visit space 20.

Specifically, when the interchange processing includes transferring the right related to the output power (right transfer processing), it is also beneficial for the management entity. For example, the management entity can contribute to the environment by assigning the value to the user 40 in return for obtaining an environmental added value from the user 40.

Modification Example 1

A Modification Example 1 of the embodiment will be described below. In the following, differences from the embodiment will be mainly described.

In the embodiment, a device (gate or settlement device) provided in the visit space 20 is used for determining whether the user 40 is present in the visit space 20. In other words, the trigger of the interchange processing is the device (gate or settlement device) provided in the visit space 20. In contrast, in Modification Example 1, the trigger of the interchange processing is the user medium 50.

Specifically, in Modification Example 1, the user medium 50 transmits a message (interchange request) requesting the start of the interchange processing to the power management apparatus 30. The interchange request may include position information of the user medium 50 that is used for identifying the visit space 20 in which the user 40 is present. The position information may be acquired by a position acquiring unit provided in the user medium 50. For example, the position acquiring unit may include a global navigation satellite system (GNSS) receiver. The position information may be acquired by the user medium 50 from the device (gate or settlement device) provided in the visit space 20.

Figure 7:
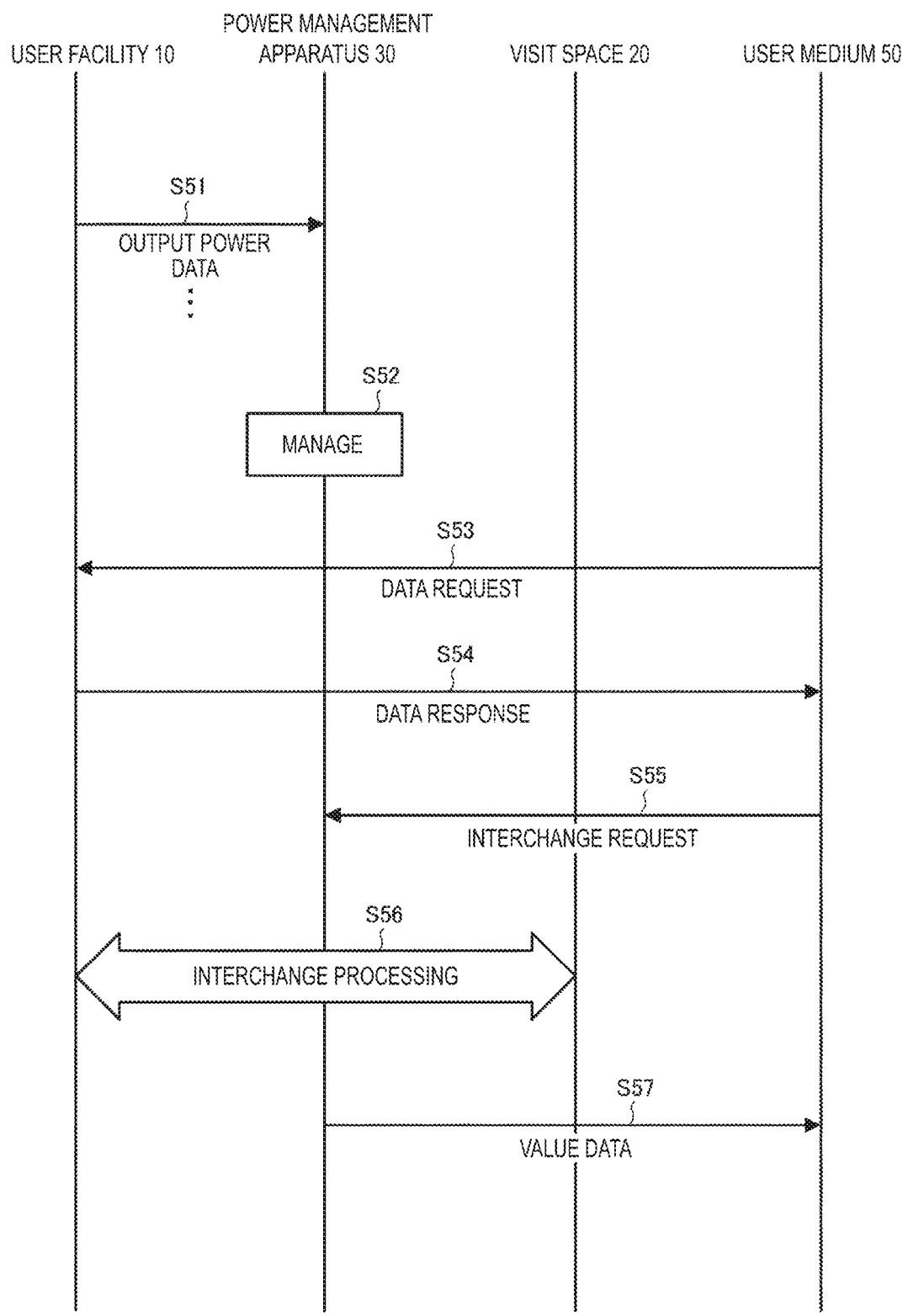
FIG. 7 is a diagram illustrating a power management method according to Modification Example 1.

As illustrated in FIG. 7, in step S51, the user facility 10 transmits the output power data to the power management apparatus 30. For example, the user facility 10 periodically transmits the output power data to the power management apparatus 30.

In step S52, the power management apparatus 30 manages the output power data.

In step S53, the user medium 50 transmits a message (data request) requesting output power data to the user facility 10. Here, a case is exemplified in which the user medium 50 is present in the visit space 20.

In step S54, the user medium 50 receives a message (data response) including the output power data from the user facility 10. The user medium 50 may display the output power data. The display unit 52 may display the right related to the output power. The user medium 50 may display information (for example, an amount of the output power or the environmental added value) for setting the content of the right related to the output power. The user medium 50 may display the value to be assigned by the interchange processing. The user medium 50 may display options to determine whether to permit the interchange processing. Here, a case is exemplified in which the user 40 performs an operation requesting the interchange processing.

In step S55, the user medium 50 transmits a message (interchange request) requesting the start of the interchange processing to the power management apparatus 30. The interchange request may include position information of the user medium 50 that is used for identifying the visit space 20 in which the user 40 is present. The interchange request may include the content of the right related to the output power to which the interchange processing is adopted.

In step S56, the power management apparatus 30 performs interchange processing of providing the output power from the user facility 10 to the visit space 20. The interchange processing is as described above.

In step S57, the power management apparatus 30 sets the value to be assigned to the user 40, and transmits the value data described above to the user medium 50. The method of setting the value is as described above.

Modification Example 2

Hereinafter, a Modification Example 2 of the embodiment will be described. In the following, differences from the embodiment will be mainly described.

In the embodiment, the distributed power supply is the solar cell device 11. In contrast, in Modification Example 2, the distributed power supply may include a power supply other than the solar cell device 11.

In Modification Example 2, the distributed power supply may include a power storage device. The power storage device may be a stationary power storage device provided in the user facility 10, or may be a power storage device provided on an electric vehicle (EV). In such a case, electric power output from the power storage device (or electric power accumulated in the power storage device) may be electric power output from a power generation device that generates electric power by utilizing natural energy.

In Modification Example 2, the distributed power supply may include a fuel cell device. For example, the fuel cell device may be a solid oxide fuel cell (SOFC), a polymer electrolyte fuel cell (PEFC), a phosphoric acid fuel cell (PAFC), or a molten carbonate fuel cell (MCFC).

In Modification Example 2, the power generation device that generates electric power by utilizing natural energy may include any one of a wind power generation device, a geothermal power generation device, and a hydropower generation device. The natural energy may also be referred to as renewable energy.

In Modification Example 2, two or more distributed power supplies selected among the various distributed power supplies described above may be used. The two or more distributed power supplies may include the solar cell device 11.

Usage Scenes

Usage scenes will be described below. In the following, a case is exemplified in which the visit space 20 is a space including the station 21. Here, as the user medium 50 to which a value is assigned in response to the power interchange, a terminal that is used for paying a fare of the train 22 is exemplified. Such a terminal may include an IC card or an application installed on a terminal such as a smartphone.

First, a case is exemplified in which a certain amount of the output power from the solar cell device 11 is provided to a management entity (for example, a railway company). A balance held by the user medium 50 before the user boards a train is 5,000 JPY.

Figure 8:
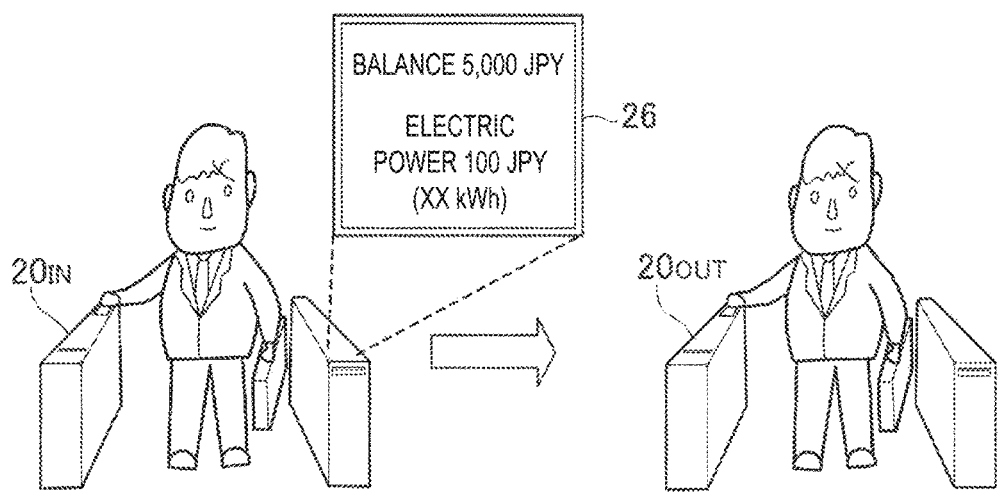
FIG. 8 is a diagram for describing a usage scene.

As illustrated in FIG. 8, when the user 40 passes through the gate 20IN provided in the boarding station 21A, a display 26 provided in the gate 20IN displays a balance for fares (5,000 JPY in FIG. 8) and displays a value (100 JPY in FIG. 8) corresponding to a certain amount of power that is provided to the management entity by the power interchange. This value may be money that is added to the balance. The display 26 may display the certain amount of power (XX kWh) that corresponds to the value.

Figure 9:
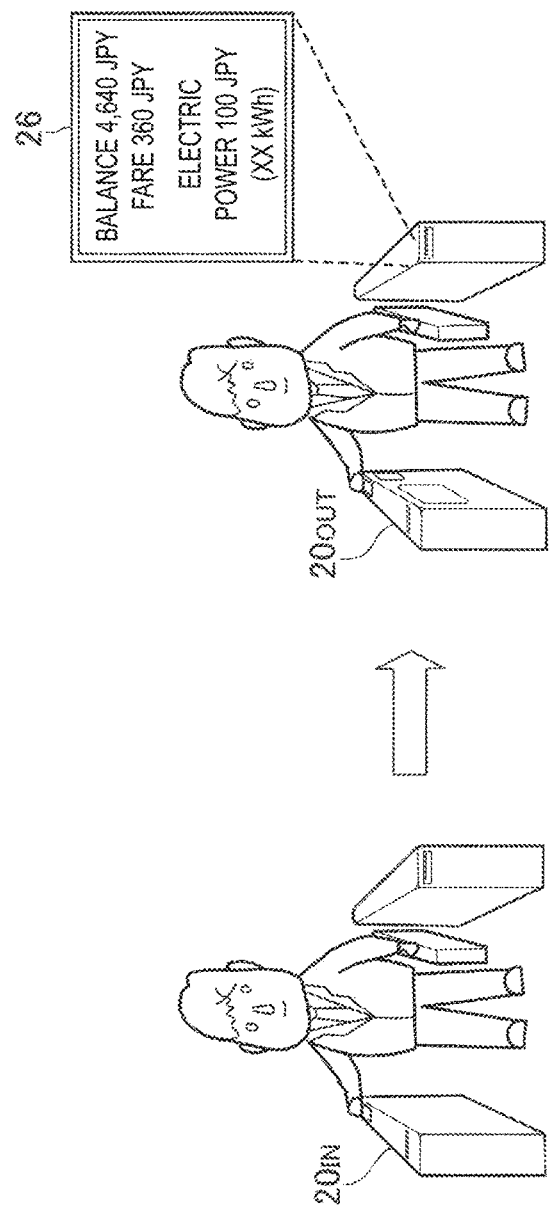
FIG. 9 is a diagram for describing a usage scene.

Alternatively, as illustrated in FIG. 9, when the user 40 passes through the gate 20OUT provided in the alighting station 21B, the display 26 provided in the gate 20OUT displays a balance for fares (4,640 JPY in FIG. 9) and a fare (360 JPY in FIG. 9), and displays a value (100 JPY) corresponding to a certain amount of power that is provided to the management entity by the power interchange. This value may be added to the balance. The display 26 may display the certain amount of power (XX kWh) that corresponds to the value.

In FIG. 8 and FIG. 9, a case is exemplified in which the display 26 displays information. However, the usage scene is not limited to this case. The information to be displayed on the display 26 may be displayed on the user medium 50, or may be displayed on both the display 26 and the user medium 50.

Second, a case is exemplified in which, of the output power of the solar cell device 11, electric power corresponding to a fare is provided to a management entity (for example, a railway company). A balance held by the user medium 50 before the user boards a train is 5,000 JPY.

Figure 10:
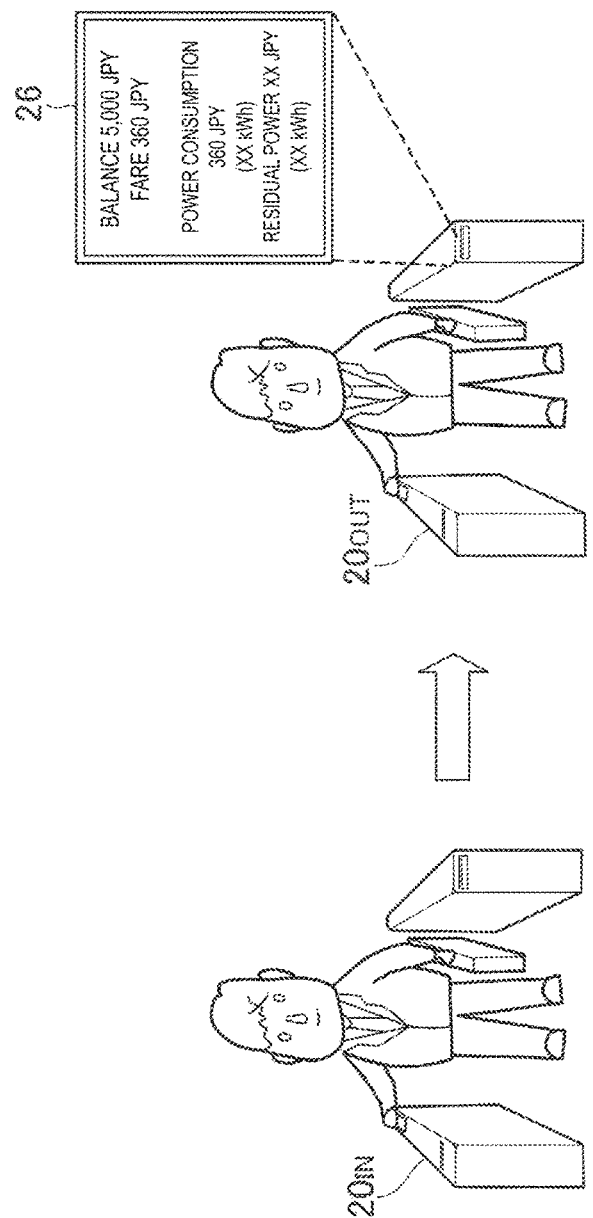
FIG. 10 is a diagram for describing a usage scene.

As illustrated in FIG. 10, when the user 40 passes through the gate 20OUT provided in the alighting station 21B, the display 26 provided in the gate 20OUT displays a balance for fares (5,000 JPY in FIG. 10) and a fare (360 JPY in FIG. 10), and displays a value (360 JPY in FIG. 10) corresponding to an amount of power provided to the management entity by the power interchange. In this way, since the value corresponding to the amount of power provided to the management entity is similar to the fare, the balance for fares is not reduced and remains at 5,000 JPY. The display 26 may display the amount of power (XX kWh) corresponding to the value (fare). The display 26 may display a residual amount of power (XX kWh) obtained by subtracting the amount of power corresponding to the fare from the amount of output power of the solar cell device 11.

In FIG. 10, a case is exemplified in which the display 26 displays information. However, the usage scene is not limited to this case. The information to be displayed on the display 26 may be displayed on the user medium 50, or may be displayed on both the display 26 and the user medium 50.

Third, a case is exemplified in which, of the output power of the solar cell device 11, electric power corresponding to a fare is provided to the management entity (for example, a store A). A balance held by the user medium 50 before the user boards a train is 5,000 JPY. The store A may be a store affiliated with Renewable Energy 100% (RE100). The store A may be a store that is located near the boarding station 21B or the alighting station 21B. The store A may be a store that has a partnership with a railway company. In such a case, the store A may be considered as a management entity in terms of indirectly managing the visit space 20.

Figure 11:
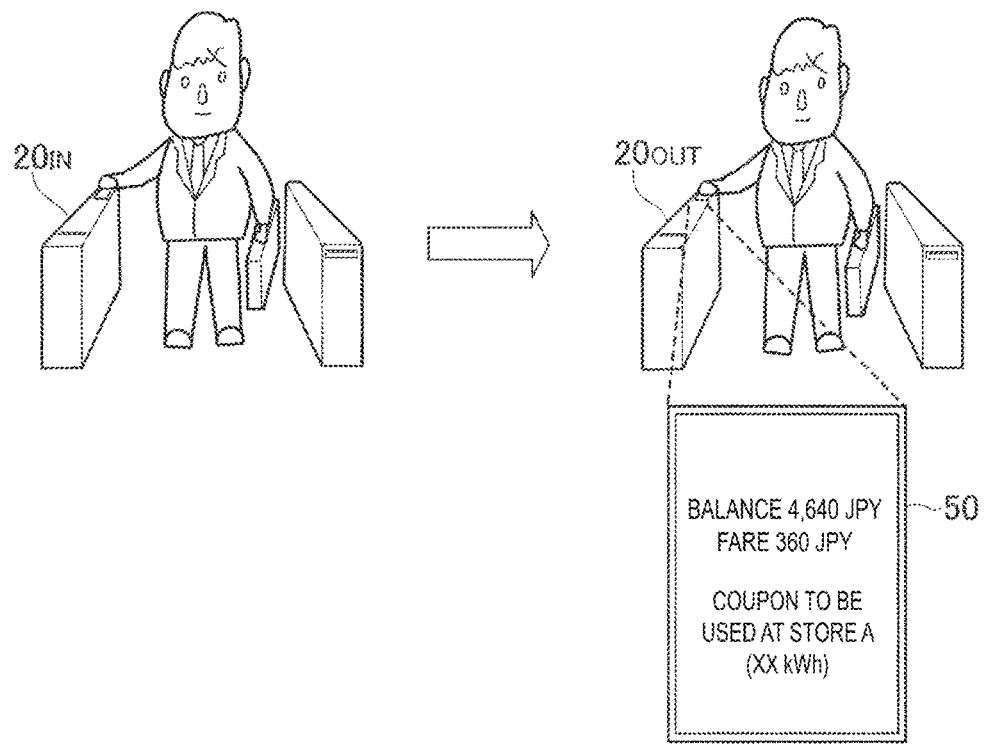
FIG. 11 is a diagram for describing a usage scene.

As illustrated in FIG. 11, when the user 40 passes through the gate 20OUT provided in the alighting station 21B, the user medium 50 displays a balance for fares (4,640 JPY in FIG. 11) and a fare (360 JPY in FIG. 11), and displays a value corresponding to an amount of power provided to the management entity by the power interchange (in FIG. 11, a coupon to be used at the store A). The display 26 may display an amount of power (XX kWh) corresponding to a value.

Fourth, a case is exemplified in which, of the output power of the solar cell device 11, electric power corresponding to a reload amount is provided to a management entity (for example, a railway company). The reload amount is an amount of money that is added to the balance held by the user medium 50.

Figure 12:
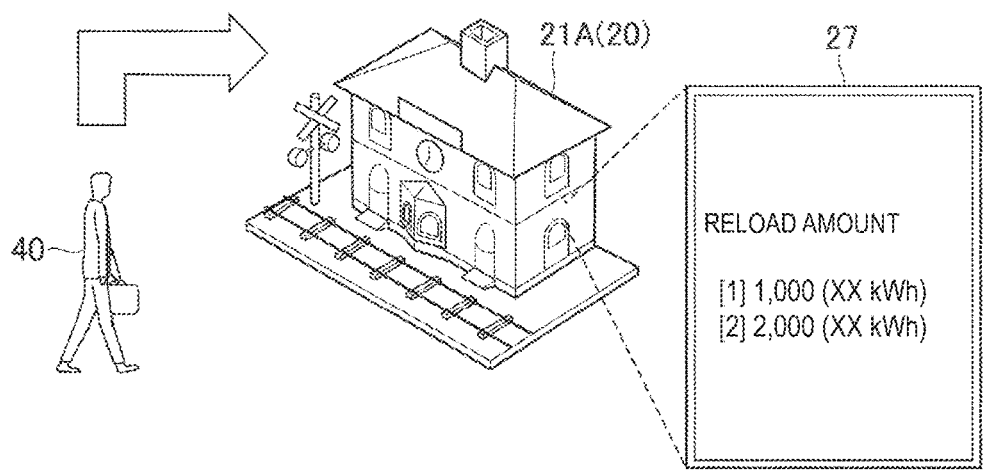
FIG. 12 is a diagram for describing a usage scene.

As illustrated in FIG. 12, in a case where the user medium 50 is an IC card, a display 27 (for example, a reload device) provided in the boarding station 21A displays a reload amount corresponding to an amount of power provided to the management entity, and displays the amount of power corresponding to the reload amount. The interchange processing is performed by selecting the reload amount.

Figure 13:
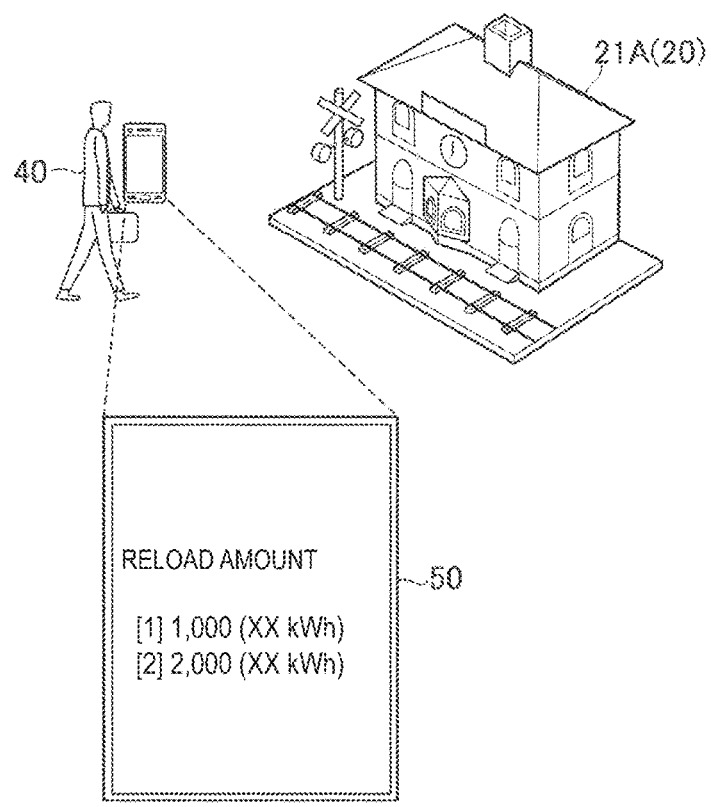
FIG. 13 is a diagram for describing a usage scene.

Alternatively, as illustrated in FIG. 13, in a case where the user medium 50 is a smartphone, when the user 40 is present in the visit space 20, the user medium 50 displays the reload amount corresponding to the amount of power provided to the management entity, and displays the amount of power corresponding to the reload amount. The interchange processing is performed by selecting the reload amount. In such a case, the reload amount may be selected in a state where the user 40 is in proximity to the building or the premises of the visit destination.

Fifth, a case is exemplified in which a tradable green certificate is transferred to a management entity (for example, a railway company) by the interchange processing of the output power of the solar cell device 11. Here, the tradable green certificate is transferred based on a travel distance of the train 22.

Figure 14:
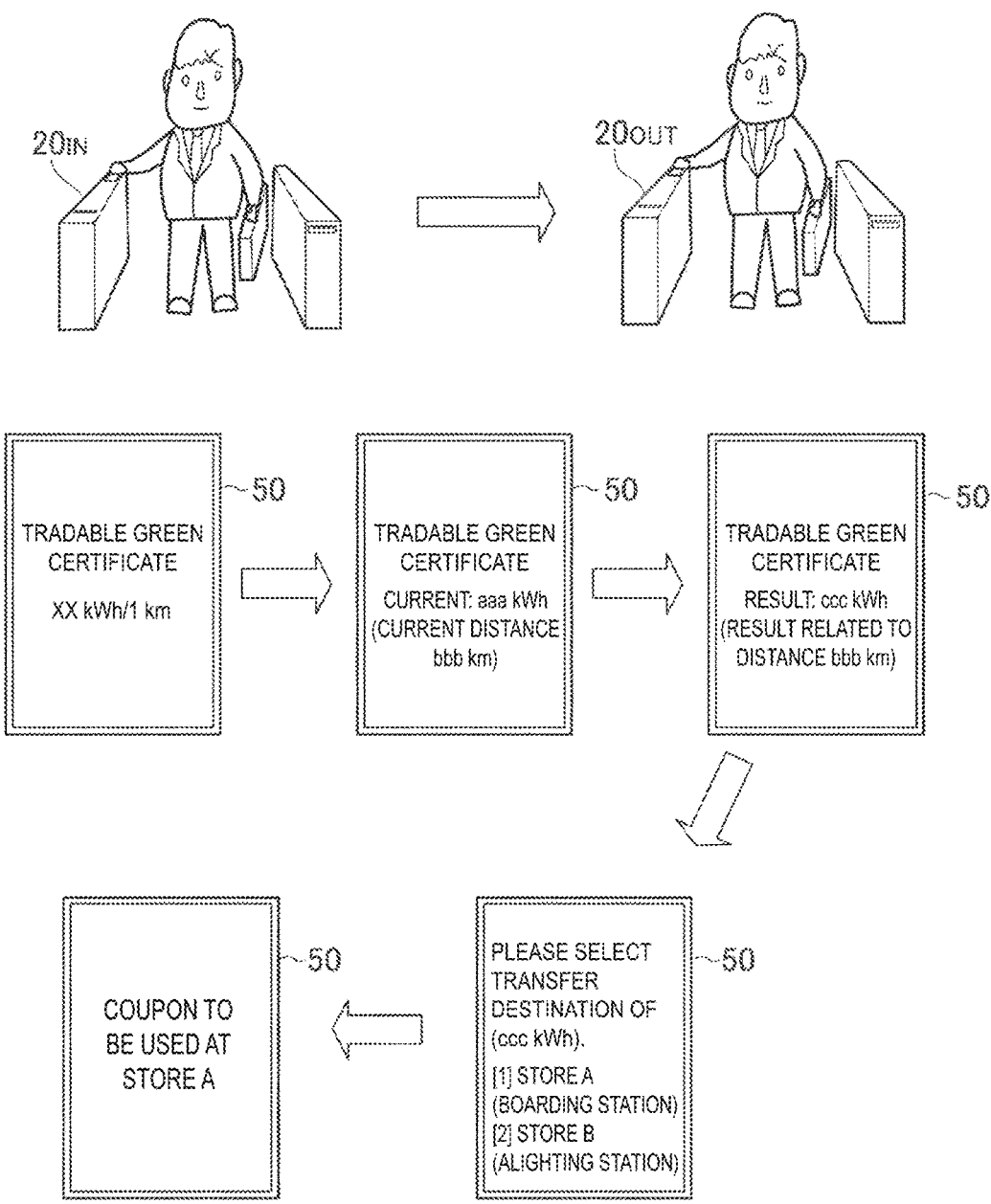
FIG. 14 is a diagram for describing a usage scene.

As illustrated in FIG. 14, when the user 40 passes through the gate 20IN in provided in the boarding station 21A, the user medium 50 displays the fact that transfer of the tradable green certificate starts. The user medium 50 may display a relationship between an amount of power corresponding to the tradable green certificate that is transferred to the management entity and a unit travel distance. While the user 40 is on the train 22, the user medium 50 displays the status of the transfer of the tradable green certificate. The user medium 50 displays a current cumulative amount of power corresponding to the tradable green certificate transferred to the management entity. The user medium 50 may display a current travel distance. When the user 40 passes through the gate 20OUT provided in the alighting station 21B, the user medium 50 displays a result of the transfer of the tradable green certificate. The user medium 50 displays a result of the cumulative amount of power corresponding to the tradable green certificate transferred to the management entity. The user medium 50 may display a result of the travel distance.

In such a case, the user medium 50 may receive value data corresponding to the tradable green certificate. For example, the user medium 50 may display options (such as the store A provided in the boarding station 21A, and a store B provided in the alighting station 21B) for the transfer destination of the tradable green certificate. The user medium 50 may display details (a coupon to be used at the store A) of an option selected by the user 40.

Here, the store A and the store B may be stores affiliated with RE100. The store A and the store B may be stores that have a partnership with a railway company. In such a case, each of the store A and the store B may be considered to be a management entity in terms of indirectly managing the visit space 20.

In the case illustrated in FIG. 14, the tradable green certificate is transferred based on a travel distance of the train 22, but the tradable green certificate may be transferred based on the length of a time period during which the user 40 is present in the visit space 20. In such a case, the travel distance may be regarded as the length of the time period.

Sixth, a case is exemplified in which the tradable green certificate is transferred to the management entity by the interchange processing of the output power off the solar cell device 11.

Figure 15:
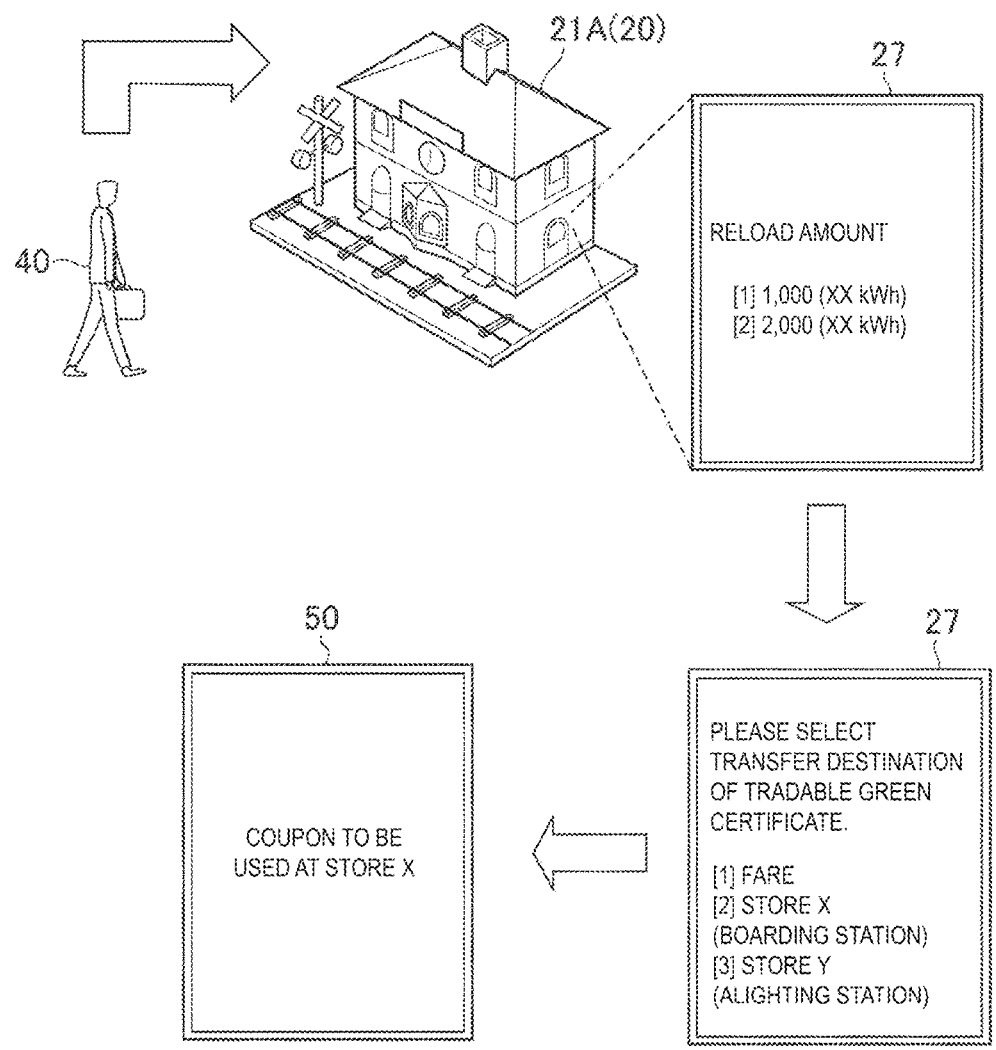
FIG. 15 is a diagram for describing a usage scene.

As illustrated in FIG. 15, in a case where the user medium 50 is an IC card, the display 27 (for example, a reload device) provided in the boarding station 21A displays a reload amount, and displays electric power corresponding to the reload amount. The display 27 displays options (a fare (railway company), a store X provided in the boarding station 21A, a store Y provided in the alighting station 21B) of the transfer destination of a tradable green certificate. The user medium 50 may display details of an option (a coupon to be used at the store X) selected by the user 40.

Here, the store X and the store Y may be stores affiliated with RE100. The store X and the store Y may be stores that have a partnership with the railway company. In such a case, each of the store X and the store Y may be considered to be a management entity in terms of indirectly managing the visit space 20.

In the case illustrated in FIG. 15, the user medium 50 is an IC card, but the user medium 50 may be a smartphone. In such a case, the display 27 may be regarded as the user medium 50.

Modification Example 3

A Modification Example 3 of the embodiment will be described below. In the following, differences from the embodiment will be mainly described.

As described in the embodiment, the user 40 having the distributed power supply (solar cell device 11) is a representative person who has the right related to the output power of the solar cell device 11. In other words, the distributed power supply may be owned by the user 40 or may be lent to the user 40.

In Modification Example 3, a case in which the distributed power supply (solar cell device 11) is owned by a third party will be described. In such a case, an aspect may be included in which the distributed power supply is lent to the user 40. Also in such a case, since the distributed power supply is installed at the user facility 10, the user 40 does not own the distributed power supply, but the user 40 may be considered to have the distributed power supply. Alternatively, the user 40 may be considered to have the distributed power supply because the user 40 has the right to perform the interchange processing on the output power output from the distributed power supply. For example, the third party may be a business operator operating the power management apparatus 30 described above. Such a business operator may be an operator such as a power generation utility, a power transmission and distribution utility, a power retailer, or a resource aggregator.

In such a case, the third party may receive, from the user 40, a price (electricity fee) for electric power consumed at the user facility 10. Furthermore, as with the embodiment, the interchange processing may be performed on surplus power obtained by subtracting electric power consumed at the user facility 10 from electric power output from the solar cell device 11. As with the embodiment, a value corresponding to the interchange processing may be assigned to the user 40. In such a case, the third party may receive from the user 40, of the electric power output from the solar cell device 11, a price for electric power provided by the interchange processing.

In this manner, in the case where the distributed power supply is owned by the third party, the user facility 10 may be based on a concept that includes an apartment block configured of two or more residential units, a concept that includes a building occupied by two or more tenants, or a concept that includes multiple facilities connected to a microgrid.

Other Embodiments

Although the present disclosure has been described by the above-described embodiment, it should be understood that the description and the drawings which form a part of this disclosure do not limit this disclosure. Various alternative embodiments, examples, and operational techniques will be apparent from this disclosure to those skilled in the art.

Although not specifically mentioned in the embodiment, when the visit space 20 is the station 21, the gate may be a ticket gate provided in the station 21. When the visit space 20 is the train 22, the gate may be provided at an entrance of the train 22. When the visit space 20 is the SC 23, the gate may be provided at an entrance/exit of the SC 23.

Although not specifically mentioned in the embodiment, the travel distance of the train 22 including the visit space 20 in which the user 40 is present may be identified by using a history of passage through the ticket gate (gate) provided in the station 21. Alternatively, the travel distance of the train 22 may be identified by position information acquired by the position acquiring unit (for example, a GNSS) included in the user medium 50.

In the embodiment, the space including the station 21, the space inside the train 22, and the space including the SC 23 are exemplified as the visit space 20. However, the embodiment is not limited to these examples. The visit space 20 may be a space that includes another other facility (an office building, an airport, a seaport, a taxi stand, a bus stop, or the like).

In the embodiment, the train 22 is used as an example of a moving body. However, the embodiment is not limited to this example. The moving body may be a moving body such as an airplane, a ship, a taxi, or a bus. Such a moving body may be a moving body that uses electricity as an energy source.

In the embodiment, the method of assigning a value to the user 40 is a method of sending value data to the user medium 50. However, the embodiment is not limited to this example. A value corresponding to the interchange processing may be assigned to means other than the user medium 50. For example, the value may be assigned as points managed by a management entity. The medium to which the value is assigned may be a credit card or a point card, or may be a server managed by the management entity. In such a case, the power management apparatus 30 may transmit the value data to the management entity.

Although not specifically mentioned in the embodiment, when the visit space 20 is a space inside the moving body, the moving body may pass through an area that belongs to each of two or more management entities. In such a case, the right and value related to the output power may be distributed depending on the length of a time period during which the user 40 is present in each of the areas belonging to the two or more management entities. Depending on a distance that the user 40 travels in each of the areas belonging to the two or more management entities, the right and value related to the output power may be distributed.

Although not specifically mentioned in the embodiment, the right related to the output power may be returned from the management entity to the user 40 when the value corresponding to the right related to the output power transferred from the user 40 to the management entity is not used in the interchange processing. For example, in a case where the value is a coupon, when the user 40 leaves the visit space 20 without using the coupon and a predetermined period elapses without the use of the coupon, the coupon may become invalid and the right related to the output power may be returned to the user 40.

Although not specifically mentioned in the embodiment, an electric power provider that manages the user facility 10 may be different from an electric power provider that manages the visit space 20. The electric power provider may be a business operator such as a power generation utility, a power transmission/distribution utility, an electricity retailer, or a resource aggregator. The resource aggregator is an electric power provider that provides electric power that flows in a reverse direction to a power generation utility, a power transmission/distribution utility, an electricity retailer, or the like in a virtual power plant (VPP).

Although not specifically mentioned in the embodiment, the electric power may be instantaneous power (kW) or integrated electric power (kWh). For example, the output power data may include instantaneous power (kW) or integrated electric power (kWh). The value corresponding to the interchange processing may be determined based on the integrated electric power (kWh) of the electric power provided by the interchange processing.

Although not specifically mentioned in the embodiment, there may be provided a program that causes a computer to execute each process to be performed by the power management apparatus 30 or the user medium 50. In addition, the program may be recorded in a computer-readable medium. Use of the computer-readable medium enables the program to be installed on a computer. Here, the computer-readable medium on which the program is recorded may be a non-transitory recording medium. The non-transitory recording medium is not particularly limited and may be, for example, a recording medium such as a CD-ROM or a DVD-ROM.

Alternatively, a chip configured of a memory that stores a program for executing each process to be performed by the power management apparatus 30 or the user medium 50 and a processor that executes the program stored in the memory may be provided.

Note that the entire contents of JP 2019-76542 (filed on Apr. 12, 2019) and JP 2019-95423, (filed on May 21, 2019) are incorporated herein by reference.

The invention claimed is:

1. A power management apparatus, comprising:
a management unit configured to manage data of output power output from a distributed power supply provided in a predetermined facility;
a detection unit configured to detect that a user having the distributed power supply is present in a visit space other than the predetermined facility, by receiving a signal indicating the user being present in the visit space from a device provided in the visit space; and
a control unit configured to, in response to a detection of the detection unit that the user is present in the visit space, perform right transfer processing that transfers a right related to the output power to a management entity of the visit space, wherein the predetermined facility includes a house owned by the user, a company or school to which the user is affiliated to, or a power selling facility owned by the user, and the right related to the output power includes at least any one of (i) a fact that the output power has been output from the distributed power supply, (ii) the output power, or (iii) an environmental added value associated with the output power.

2. The power management apparatus according to claim 1, wherein the distributed power supply includes a power generation device configured to utilize natural energy to generate electric power.

3. The power management apparatus according to claim 1, wherein the control unit is configured to assign a value corresponding to the right transfer processing to the user.

4. The power management apparatus according to claim 1, wherein the detection unit is configured to detect at least one of the user entering the visit space or the user exiting from the visit space, based on the user passing through a gate provided in the visit space.

5. The power management apparatus according to claim 1, wherein the detection unit is configured to detect that the user is present in the visit space based on the user using a settlement device provided in the visit space.

6. The power management apparatus according to claim 3, wherein the control unit is configured to set the value to be assigned to the user based on a length of a time period during which the user is present in the visit space.

7. The power management apparatus according to claim 3, wherein the visit space is a space inside a moving body that carries the user, and the control unit is configured to set the value to be assigned to the user based on a travel distance of the moving body.

8. A power management system, comprising:

a distributed power supply provided in a predetermined facility;

a management unit configured to manage data of output power output from the distributed power supply;

a detection unit configured to detect that a user having the distributed power supply is present in a visit space other than the predetermined facility, by receiving a signal indicating the user being present in the visit space from a device provided in the visit space; and a control unit configured to, in response to a detection of the detection unit that the user is present in the visit space, perform right transfer processing that transfers a right related to the output power to a management entity of the visit space, wherein the predetermined facility includes a house owned by the user, a company or school to which the user is affiliated to, or a power selling facility owned by the user, and the right related to the output power includes at least any one of (i) a fact that the output power has been output from the distributed power supply, (ii) the output power, or (iii) an environmental added value associated with the output power.

9. A power management method, comprising:

managing data of output power output from a distributed power supply provided in a predetermined facility;

detecting that a user having the distributed power supply is present in a visit space other than the predetermined facility, by receiving a signal indicating the user being present in the visit space from a device provided in the visit space; and in response to detecting that the user is present in the visit space, performing right transfer processing that transfers a right related to the output power to a management entity of the visit space, wherein the predetermined facility includes a house owned by the user, a company or school to which the user is affiliated to, or a power selling facility owned by the user, and the right related to the output power includes at least any one of (i) a fact that the output power has been output from the distributed power supply, (ii) the output power, or (iii) an environmental added value associated with the output power.

10. The power management apparatus according to claim 1, wherein the detection unit is further configured to detect that the user is approaching the visit space based on location information received from a user medium carried by the user, and the control unit is further configured to, in response to the detection unit detecting the approaching of the user, perform the right transfer processing based on the data of the output power received.

11. The power management apparatus according to claim 1, wherein the control unit is further configured to assign a value corresponding to the right transfer processing to the user, wherein the value is related to the visit space, and in response to the user leaving the visit space without using the value assigned to the user, disable the value.

12. The power management system according to claim 8, wherein the detection unit is further configured to detect that the user is approaching the visit space based on location information received from a user medium carried by the user, and the control unit is further configured to, in response to the detection unit detecting the approaching of the user, perform the right transfer processing based on the data of the output power received.

13. The power management system according to claim 8, wherein the control unit is further configured to assign a value corresponding to the right transfer processing to the user, wherein the value is related to the visit space, and in response to the user leaving the visit space without using the value assigned to the user, disable the value.

14. The power management method according to claim 9, further comprising:

detecting that the user is approaching the visit space based on location information received from a user medium carried by the user, and in response to said detecting the approaching of the user, performing the right transfer processing based on the data of the output power received.

15. The power management method according to claim 9, further comprising:
assigning a value corresponding to the right transfer processing to the user, wherein the value is related to the visit space, and
in response to the user leaving the visit space without using the value assigned to the user, disabling the value.

16. The power management apparatus according to claim 1, wherein
the control unit is configured to, in said performing of the right transfer processing,
provide the output power from the predetermined facility to the visit space based on the data of the output power, and
allow the user to utilize the output power output from the predetermined facility to the visit space.

17. The power management system according to claim 8, wherein
the control unit is configured to, in said performing of the right transfer processing,
provide the output power from the predetermined facility to the visit space based on the data of the output power, and
allow the user to utilize the output power output from the predetermined facility to the visit space.

18. The power management method according to claim 9, wherein
in said performing of the right transfer processing,
the output power is provided from the predetermined facility to the visit space based on the data of the output power, and
the user is allowed to utilize the output power output from the predetermined facility to the visit space.

* * * * *